July 2, 1935.    H. T. THOMAS    2,006,753
CLUTCH OPERATING MECHANISM
Filed May 16, 1932    2 Sheets—Sheet 1
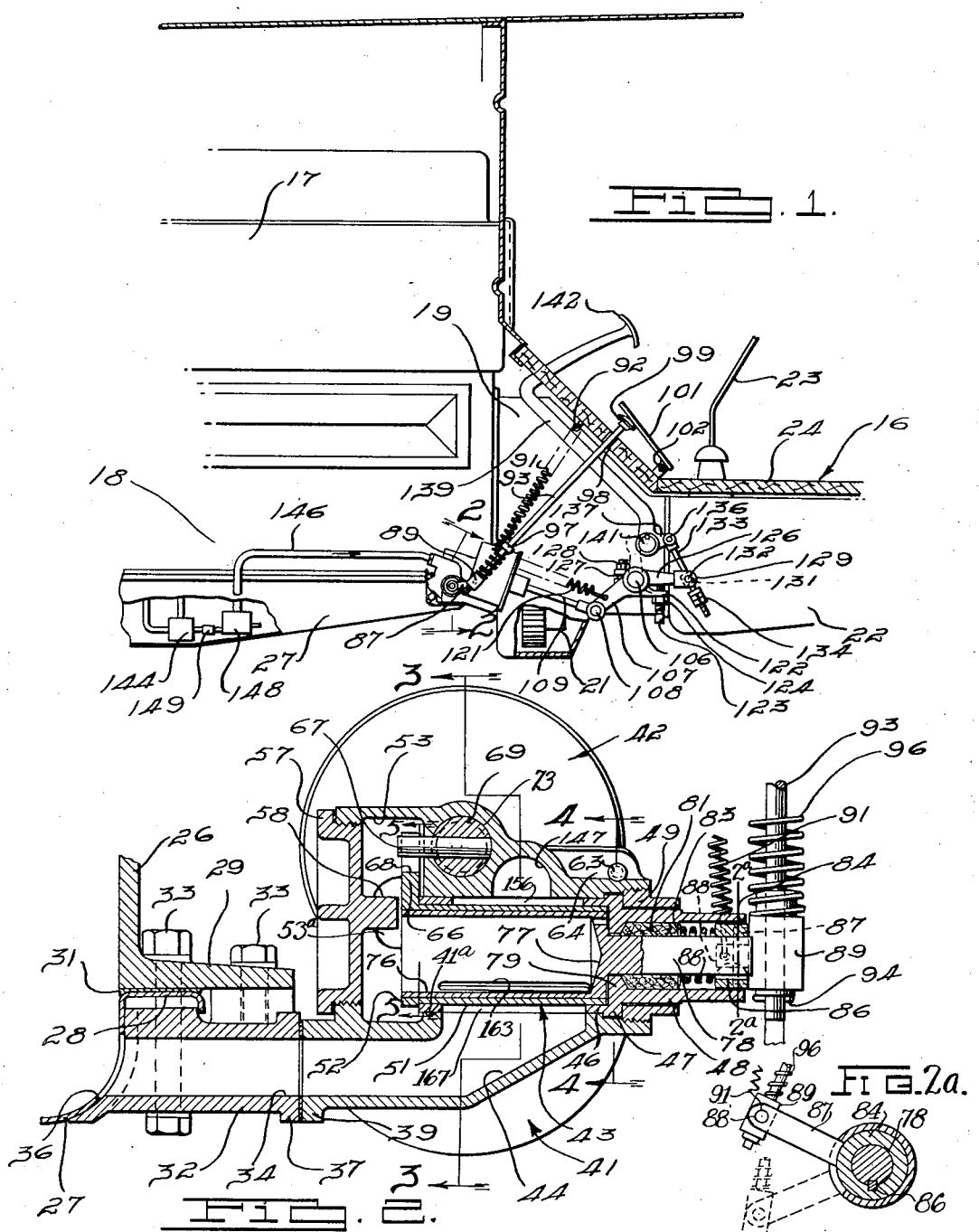
INVENTOR
Horace T. Thomas.
BY
ATTORNEYS.

July 2, 1935.  H. T. THOMAS  2,006,753
CLUTCH OPERATING MECHANISM
Filed May 16, 1932   2 Sheets-Sheet 2
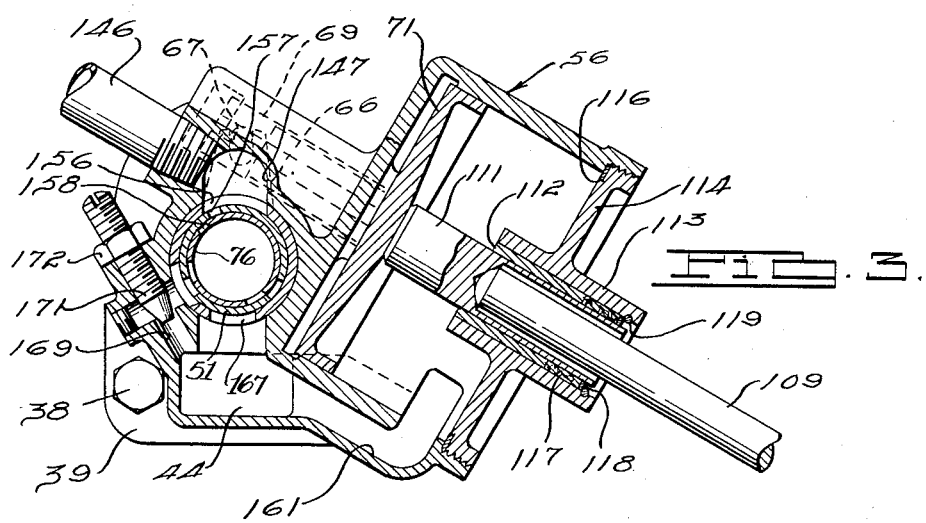
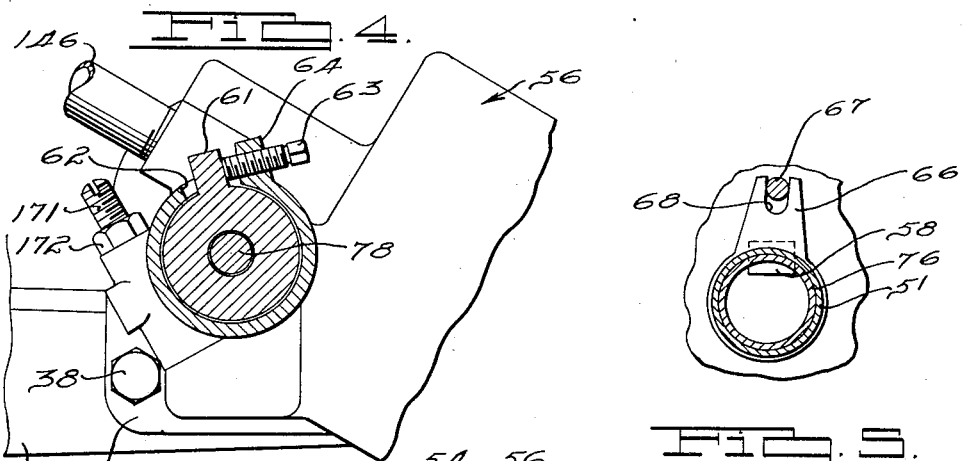
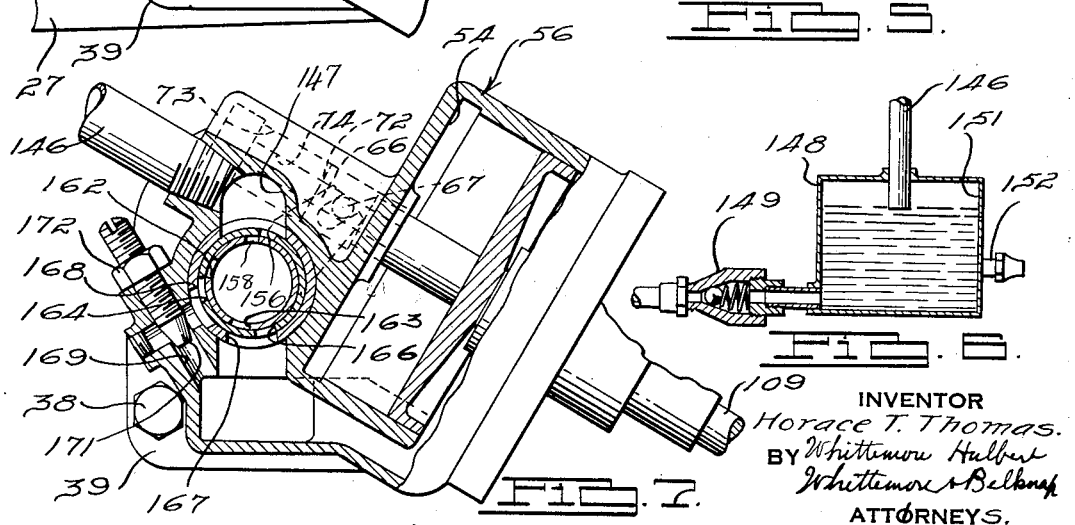
INVENTOR
Horace T. Thomas.
BY Whittemore Hulbert
Whittemore & Belknap
ATTORNEYS.

Patented July 2, 1935

2,006,753

UNITED STATES PATENT OFFICE 2,006,753

CLUTCH OPERATING MECHANISM

Horace T. Thomas, Lansing, Mich., assignor to Reo Motor Car Company, Lansing, Mich., a corporation of Michigan Application May 16, 1932, Serial No. 611,677

3 Claims. (Cl. 192—91)

This invention relates generally to clutch operating mechanisms and has particular relation to clutch operating mechanisms especially applicable for operation by fluid pressure and for employment in the operation of motor vehicles.

An object of the invention is to provide a mechanism for operating the clutch of a motor vehicle from the oil or other fluid pressure generated by the engine thereof and which can be employed during the gear shifting or the coasting of a motor vehicle and under the control of the operator thereof in place of the manual effort heretofore required for effecting such operations.

Another object of the invention is to provide a compact and simplified structure for fluid pressure actuated clutch controlling mechanisms which can be secured as a unit to some part of the motor vehicle body adjacent the clutch operating mechanism and there attached and operatively connected to the operating mechanism without the considerable amount of effort heretofore involved in installation of such apparatus.

Another object of the invention is to provide a unitary clutch operating mechanism embracing a servo-motor and a valve, under the control of the vehicle operator, for automatically applying the power of the servo-motor for rapidly moving the controlling mechanism of a vehicle clutch into a position where its parts almost engage and thereafter slowly and smoothly actuating the clutch operating mechanism until the parts of the clutch frictionally engage to place the vehicle in motion.

Another object of the invention is to eliminate entirely the ordinary manually operated clutch pedal which heretofore has been employed for directly engaging and disengaging the clutch elements and to provide in place thereof a manually controlled fluid operated clutch actuating mechanism having an attachment by which the clutch may be disengaged manually whenever the pedal for operating the brake of the vehicle is depressed to a predetermined extent.

Another object of the invention is to provide an extremely sensitive clutch operating mechanism which can be actuated without any noticeable effort on the part of a vehicle operator and which will respond quickly and exactly to the most minute variations in the position of its actuating mechanism.

Another object of the invention is to provide a clutch operating mechanism which can be secured as a unit to the crank case of an engine employed in operating a motor vehicle and which contains all of the mechanism necessary for the operation of a clutch and requires nothing more than attachment to the vehicle to render it ready for use.

In the particular embodiment of the invention disclosed herein for the purpose of illustration, the crank case of a motor vehicle is provided with an inlet opening communicating with an attaching member provided with flanges to which is secured the outlet passage of a unitary casing embracing a valve controlled servomotor. The servo-motor has a piston for operating a rod which is connected directly to the vehicle clutch operating mechanism and actuated by oil, or other fluid, supplied by a conduit communicating with the motor vehicle lubricating oil circulating pump. The valve, by which the servo-motor is controlled, has an actuating rod and a pedal accessible to the motor vehicle operator and is also actuated automatically in accordance with the position of the piston of the servo-motor.

The operating lever for the clutch also has an extension and a lost-motion connection which becomes operative for throwing out the clutch whenever the brake pedal of the vehicle is depressed to a predetermined extent, as it normally would be when stopping the motion of the vehicle.

In the drawings:

Figure 1 is a fragmentary, longitudinal sectional view, through a motor vehicle employing a clutch operating mechanism embracing the principles of the invention;

Figure 2 is a transverse sectional view of the clutch operating mechanism shown by Figure 1 and as it might appear along line 2—2 of Figure 1 looking in the direction of the arrows;

Fig. 2A is a section on line 2A—2A, Fig. 2.

Figure 3 is a longitudinal sectional view through the clutch operating mechanism as it would appear substantially on line 3—3 of Figure 2;

Figure 4 is a longitudinal sectional view through the clutch operating mechanism as it might appear in the plane of line 4—4 of Figure 2;

Figure 5 is another longitudinal sectional view of the structure, taken substantially on line 5—5 of Figure 2;

Figure 6 is an enlarged cross-sectional view of an oil reservoir for supplying fluid under pressure for operating the mechanism;

Figure 7 is a view similar to Figure 3 except that the parts of the mechanism are disclosed in a different operative position;

Referring particularly to Figure 1, a motor vehicle 16, employed in practicing the invention, comprises an engine 17 having a crank case 18 from a rear portion of which extends a clutch housing 19 in which is contained any suitable clutch mechanism 21 by which the power of the engine gradually is applied for operating the vehicle. On the rear end of the clutch housing 19 is secured a transmission housing 22 in which is located any suitable speed and torque changing mechanism for varying the performance of the vehicle under different conditions of operation. This mechanism is controlled by a gear shift lever 23 projecting through the vehicle floor 24 and into the passenger compartment where it is accessible to the vehicle operator.

The crank case 18 comprises an upper section 26 and a lower section or oil pan 27 which are provided with cooperating flanges 28 and 29 normally bolted or otherwise rigidly secured together. A resilient gasket 31 normally is employed between the flanges 28 and 29 to insure against the leakage of oil from the supply thereof which the crank case normally contains. For the purposes of this invention there is secured, beneath the flanges 28 and 29 and adjacent the rear end of the crank case 18, a heavy bracket or attaching member 32 which is held in position beneath the flanges by bolts 33 extending therethrough and through the flanges. The bracket 32 is provided with a passage 34 extending inwardly thereof and communicating with an opening 36 formed in the side of the lower section 27 of the crank case adjacent thereto.

The outer end of the member 32 is provided with a flange 37, surrounding the entrance to the passage 34, and to which is secured by bolts 38, a supporting flange 39 of a casing 41 of a motor vehicle clutch operating mechanism 42. Secured in a cylindrical opening 41a formed transversely of the casing 41 is a controlling valve 43 which communicates with the passage 34 in the supporting member 32 through a passage 44 formed therebetween in the lower part of the casing. The valve 43 comprises an outer sleeve 46, mounted within the cylindrical opening, having a flange 47 formed at one end thereof abutting a shoulder formed in the casing at one end of the cylindrical opening. Beyond the flange 47 the sleeve is reduced somewhat in external diameter to provide an extension 48 around which is disposed a ring 49 secured in a threaded opening formed in the casing and abutting at the inner end thereof the flange 47 for holding the sleeve 46 against rotation within the casing.

In order to be able to vary the angular position of the outer sleeve 46 within the casing 41, the flange 47 of the casing is provided with an outwardly projecting lug 61 which extends through an opening 62 of the casing and there is engaged by the end of a set screw 63 which is threaded in an opening extending across a web 64 formed in the casing along the edge of the opening 62. By adjusting the set screw 63 from one limit to another, the position of the sleeve 46 may be adjusted to any extent within the limits of the width of the notch or opening 62.

Inside the stationary sleeve 46 is rotatably disposed an outer sleeve 51, one end of which is provided with a flange 52 abutting the end of the stationary sleeve 46 opposite the flange 47. This flange is disposed in a relatively large cavity or chamber 53, one end of which is in open communication through the port 53a with the interior of a cylinder 54 of a fluid actuated servomotor 56. In order to provide access to the interior of the chamber 53, and the parts of the valve 43 accessible therefrom, the casing is provided with a removable side wall or closure member 57, which is tightly threaded into an opening in the casing communicating with the chamber. The closure member 57 is provided with an axial lug 58, the end of which is disposed directly opposite one side of the sleeve 51 to prevent displacement of the latter outwardly from within the stationary sleeve 46.

One side of the flange 52 within the chamber 53 is enlarged as is indicated at 66 to provide an arm for controlling the angular position of the rotatable sleeve 51 within the stationary sleeve 46. This arm is actuated by a pin 67, projecting through a slot 68 formed in the end 15 of the arm, and carried by a pilot rod 69 secured to and operated by a piston 71 which is slidably disposed in the cylinder 54. The pilot rod has an enlarged end portion 72 which is slidably disposed in a cylindrical opening 73 formed beyond the head end of the cylinder 54 and arranged concentrically relative thereto. Along the side of the cylindrical opening 73 is an elongated notch 74 formed between the passage and the interior of the chamber 53 for slidably receiving the pin 67 and holding the latter in proper position within the slot 68.

Any movement of the piston 71 will result in a corresponding movement of the pin 67 which in turn rotates the sleeve 51 within the stationary sleeve 46.

Inside the sleeve 51 is rotatably mounted an inner sleeve 76 having a head 77 formed in the end thereof opposite the chamber 51 and from which projects an axially disposed sleeve operating rod or shaft 78. This end of the sleeve seats against an annular shoulder 79, formed on the stationary sleeve 46 and directly inwardly from the flange 47, and the inner periphery of which closely surrounds the shaft 78.

The inside of the reduced portion 48 of the stationary sleeve 46 is filled with any suitable packing material 81 which is resiliently pressed against the adjacent surface of the shoulder 79 by a spring 82 in turn compressed between a washer 83 supported by the packing and an annular boss 84 which is secured on the outer end of the shaft 78 by a key 86. Projecting laterally from the boss 84 and through a motion limiting slot formed in the outer extremity of the extension 48 is an integral operating arm 87, through the outer end of which extends a pin 88 projecting laterally from one side of a cylindrical collar 89. The pin 88 is held rotatably within the end of the arm by an end portion of a coil spring 91 projecting through an opening formed therein and the opposite end of which is secured, as is indicated at 92, to the floor 24 of the vehicle, thus serving the purpose of resiliently holding the arm against the upper limit of the notch formed in the outer end of the reduced portion 48 of the sleeve 46.

Inside the collar 89 is slidably disposed a valve operating rod 93 having a pin 94 projecting through the lower end thereof which is held resiliently against the adjacent surface thereof by a spring 96 abutting the opposite surface of the collar at one end and at the opposite end abutting a boss 97 secured upon the rod 93. The upper end of the rod 93 extends through an opening 98 formed in the floor of the vehicle 16 and there is provided with an enlarged end 99 which may be employed for operating the rod directly or the enlarged end may support the free end of a pedal 101 pivoted to the floor board adjacent the rod as is indicated at 102.

When the operator's foot engages either the pedal 101 or the enlarged end 99, the rod 93 will be depressed and the resultant compression of the spring 96 will rotate the arm 87 and the inside sleeve 76 of the valve 43.

In order to provide means for operating the clutch 21 there projects from the clutch housing 19 a clutch operating shaft 106, on the outer end of which is rotatably secured an operating arm 107. The end of the arm carries a pin 108 by which the arm is pivotally secured to the end of a piston rod 109 the opposite end of which is loosely disposed in a cylindrical opening formed in the end of a piston rod extension member 111. The latter member is slidably disposed in a bushing 112 which is rigidly secured in a cylindrical sleeve 113 having a circular web 114 projecting transversely therefrom and the outer periphery of which is threaded in an open end of the cylinder 54 against a shoulder 116 formed therein. The outer extremity of the bushing 112 terminates inside the sleeve 113 and also inside the outer end of the extension member 111, when the latter is at its inner limit of travel. In the annular space thus provided is disposed a quantity of packing material 117 which is held in position by an annular ring 118. An open toroidal spring 119 seated in an annular recess formed on the inner surface of the sleeve 113 secures the ring 118 in position within the sleeve.

While outward movement of the piston 71 will also move the piston rod extension member 111 and the piston rod 109, it is apparent that the piston rod can be moved independently of the other two. The rod, however, is resiliently held in such position as to contact with the extension member 111 by a coil spring 121, one end of which is secured in an opening formed in the lever 107 while the opposite end is secured to some convenient part of the engine 17 or of the motor vehicle frame adjacent thereto.

Rigidly secured on the clutch shaft 106 adjacent to the rotatably mounted lever 107 is clutch operating lever 126 having a split end 127 with a bolt 128 projecting thereacross by which the lever is secured in position. In order to provide means for positively operating the clutch 21 in response to the movement of the piston 71, the arm 107 is provided with an outwardly extending lug 122 having projecting thereacross a set screw 123 normally locked in position by a nut 124 and at one end engaging the lever 126.

When the piston 71 is moved outwardly, the set screw 123 will be moved against the arm 126 for operating the latter in response to the rotation of the arm 107. This movement of the arm 126 positively disengages the elements of the clutch 21 thus permitting the engine 17 to run independently of the vehicle while a movement of the piston in an opposite direction permits the clutch elements to be engaged for driving the vehicle. It is apparent however that the lever 126 may be moved independently for operating the clutch 21 without affecting the position of the arm 107 or the piston 71.

The outer end of the arm 126 has a bifurcated end 129 in which is pivotally mounted a block 131 having pins 132 extending from opposite ends thereof and disposed in openings formed in the bifurcated ends. This block has an opening extending transversely thereacross in which is slidably disposed a rod 133, on one end of which are threaded a plurality of locknuts 134, while the opposite end thereof is pivoted as indicated at 136 to a lug 137 projecting outwardly from a vehicle brake operating lever 139. The lever 139, which is keyed at one end upon a brake operating shaft 141, is curved at the opposite end in such manner as to project outwardly through an opening formed in the vehicle floor 24 and there is provided with a pad 142 for engagement with the operator's foot when the brake of the vehicle is applied.

The nuts 134 are so located on the rod 133 that the block 131 normally is not engaged by the nuts during the operation of the brake unless the brake pedal 141 is depressed to a considerable extent. Under such circumstances the block will cause a slight rotation of the lever 126 which, in turn, will disengage the clutch 21.

In order to avoid creating a pressure in front of the piston 71 as might otherwise result from the movement of the piston and also in order to drain from the cylinder any oil which might leak beyond the piston; the interior of the cylinder, in a region remote from the head thereof, is connected by a passage 161 with the passages 44 and 34 communicating with the interior of the crank case through the opening 36.

In order to provide means for operating the piston 71, the engine oil pump 144 is connected by a conduit 146 with a cavity 147 formed inside the casing 41 immediately adjacent the central portion of the valve 43. While such expedient ordinarily is not necessary, it may be desirable in certain instances to provide the conduit 146 with an oil supply reservoir 148 in which a quantity of oil under pressure may be stored for use during any short period when the oil pressure within the system is relatively low or when the demand for oil is slightly greater than the capacity of the oil pump. The section of the conduit 146 between the oil pump and the tank 148 may be provided with a check valve 149 and the tank may be connected to the opposite section of the conduit in such manner as to provide a fluid pressure space indicated at 151. A spring pressed relief valve 152 is attached to the tank 148, or some other part of the fluid circulating system, for the purpose of relieving the pressure therein should any part of the system fail to function properly.

The cavity 147 is adapted to communicate with the interior of the valve 43 through a large elongated opening 156 formed in the stationary sleeve 46 adjacent thereto and a pair of narrow ports 157 and 158 formed in the outer and inner rotatable sleeves 51 and 76 respectively and from one end to the other of the elongated opening 156. With the piston 71 in its normal position adjacent the head of the cylinder 54, which is the position occupied when the clutch is engaged, the port 157 in the outer sleeve 51 occupies a position adjacent one side of the opening 156 in the stationary sleeve; this side being the one away from which the port will be rotated by the rotation of the sleeve 51 when the piston moves away from the head of the cylinder during the disengagement of the clutch.

The notch in the outer end of the reduced portion 48 of the stationary sleeve 46 is so arranged that the spring 91 which maintains the arm 87 against one of the extremities of the notch will hold the port 158 just beyond the trailing edge of the port 157 and in such position that it will tend to cross the latter port when the pedal 101 is depressed for releasing the clutch.

In the event the vehicle operator should depress the pedal 101 enough so that the leading edge of the port 158 would pass beyond the trailing edge of the port 157 and then should hold the pedal in this position; the pressure of the oil in the cavity 147 then will cause oil to flow through the registering portions of the ports 157 and 158 and, assuming the valve and the other parts of the mechanism to be already filled with oil at low pressure, such flow of oil into the valve will almost instantly increase the pressure of all of the oil, which will then result in a movement of the piston 71 away from the head of the cylinder 54. Such movement of the piston will also move the pin 67, which in turn will so rotate the sleeve 51 as to move the port 157 away from the port 158 until the registering openings between them are closed by the alignment of the trailing and leading edges of the ports respectively. Under such conditions the flow of oil will be discontinued through the ports and there will be no further movement either of the piston 71 or of the port 157.

Should the operator of the vehicle continue to depress the pedal 101 by a series of limited movements between which the pedal would be held motionless for a short period, the port 158 will overlap the port 157 slightly at the beginning of each of such movements and thereafter in each instance the resultant series of movements of the piston 71 will immediately close the registration between the two ports and discontinue the flow of oil, during each period in which the pedal is held motionless. In other words, the movement of the piston 71 is proportional to the depression of the pedal 101 and the shaft 106 controlling the clutch 21 may be rotated to any desired extent and at any speed depending upon the extent and rate of depression of the pedal 101.

Under normal circumstances, when the operator of the vehicle desires to disengage the clutch 21, the pedal 101 simply will be depressed to the maximum extent by a single and uninterrupted movement, which will rotate the port 158 toward the opposite side of the elongated opening 156 at the same rate of movement that the pedal 101 is depressed. As the port 158 registers with the port 157 during this movement oil from the recess 147 will flow rapidly through the valve 43 and into the cylinder 54 and will move the piston 71 away from the head of the cylinder fast enough to move the port 157 in unison with the port 158 to maintain the flow of oil to the cylinder through the two ports. When the pedal 101 reaches its limit of travel, the movement of the port 158 will be discontinued but the port 157 will continue to move as long as it is possible for any oil to flow through the two ports. It will be apparent that just before the trailing edge of the port 157 crosses the leading edge of the port 158 that the flow of oil through the two ports will be greatly throttled and that this will decrease the rate of movement of the piston 71 and permit all of the parts of the mechanism to come to rest gradually.

Should the operator of the vehicle release the pedal 101 slightly from the aforesaid fully depressed position, some of the oil within the cylinder 54 will immediately be discharged through a plurality of exhaust ports formed in the valve 43 thus permitting the piston 71 to move towards the head of the cylinder 54 and the elements of the clutch to move to a corresponding extent towards their engaged position.

In the present form of the invention, the exhaust ports comprise a pair of elongated ports 162 and 163 formed in parallel relation and longitudinally of the inner sleeve 76, and a similar pair of ports 164 and 166 formed in the outer sleeve 51. The ports 163 and 166 communicate directly with the passage 44 leading to the crank case through a relatively wide and elongated opening 167 formed in the stationary sleeve. The ports 162 and 164 also communicate with the passage 44 but through a wide and elongated opening 168 formed in the sleeve 46 and an intermediate passage 169 in which is disposed a throttling valve 171 which is threaded into the casing and secured adjustably in any desired position by a nut 172.

The ports 162 and 164 are disposed relative to one another in exactly the opposite relation to the arrangement of the ports 157 and 158 but in such position that the leading edge of the port 162 will uncover the trailing edge of the port 164 whenever the pedal 101 is released. The ports 163 and 166 are arranged in the same relation as the ports 162 and 164 except that the port 163 lags behind the port 166 to a slight extent and the two will not register unless it is desirable to quickly engage the elements of the clutch 21.

In such event the pedal 101 is released entirely by the removal of the operator's foot therefrom and the resultant rapid movement of the inner sleeve 76 moves the exhaust ports 162 and 163 both into open communication with the ports 164 and 166 respectively. Thereafter, the oil from the cylinder 54 will be quickly discharged through the valve 43 and into the crank case 18 through the passages 34 and 44. When the pedal reaches its upper limit of travel, however, the movement of the ports 162 and 163 will be discontinued although the ports 164 and 166 will continue to move until all of the ports are out of register and the motion of the piston 71 is discontinued as a result thereof. Inasmuch as the port 163 lags behind the port 166 to a slight extent the trailing edge of the latter will pass the leading edge of the former before the ports 162 and 164 are out of register. Thereafter, during a short interval the oil will flow from the cylinder 54 only through the registering portions of the ports 162 and 164 and through the passage 169 through which the flow of fluid is materially limited by the valve 171. Such restriction in the flow of fluid from the cylinder 54 materially decreases the rate of motion of the piston 71 thus resulting in the gradual engagement of the elements of the clutch 21 just prior to the upper limit of movement of the pedal 101.

This allows the elements of the clutch to engage easily regardless of where the region of engagement of the clutch is relative to the movement of the pedal 101, so long as the movement of the pedal is discontinued approximately in such region of engagement. As heretofore explained, with reference to the disengaging movement of the clutch, the clutch operating mechanism may be operated as slowly as is desired either by releasing the pedal by relatively short intermittent movements or by a slow and continuous movement. In either event the piston 71 moves the inside sleeve 76 to cut off the exhaust of fluid from the cylinder 54 whenever there is any tendency for the piston 71 to move at a greater rate or farther in proportion to its length of movement than the pedal 101 has moved. While for the purpose of illustration and in order to render the mechanism adjustable to satisfy any conditions of operation; two sets of exhaust ports are provided for the valve 43, it is to be understood that either set may be entirely eliminated, together with the passages associated therewith, and the valve operated entirely by one set of such ports.

In the event the engine is not running and it is desired to disengage the elements of the clutch, this may be done manually simply by depressing the brake pedal 141 somewhat further than it might ordinarily be depressed merely for the purpose of slowing down the motion of the car. Under such circumstances the brake pedal should be depressed with a considerable force such as might be applied whenever it should be desired to entirely stop the motion of the vehicle. When the pedal is so depressed it will move downwardly far enough for the nuts 134 on the rod 133 to engage the block 131, thus rotating the arm 126 slightly and disengaging the clutch sufficiently that the gear shift lever 123 may be operated to throw the transmission mechanism into neutral position and thereafter the brake pedal may be released as an ordinary clutch pedal would be released under similar circumstances.

During such movement of the arm 126, under the influence of the brake pedal, the piston 71 will not be moved in the cylinder 54 because the rotatable connection between the clutch shaft 105 and the arm 107 permits the arm 126 to be moved away from the set screw 123 without rotating the arm 107. This connection between the vehicle brake and the clutch thereof also renders it possible to disengage the clutch 21 during the movement of the vehicle and without depressing the pedal 101, in the event it is desired to bring the vehice to a complete stop. In such event the brake pedal 141 is depressed with considerable force, as it would be under any circumstances when stopping the vehicle relatively quickly, and such depression will move the lever 139 downwardly far enough for the nuts 134 to engage the block 131 and rotate the lever 126 into clutch disengaging position. The gear shift lever 23 then may be moved into neutral position and the brake released whenever the car finally comes to rest.

In view of this connection between the clutch operating mechanism and the brake lever of the vehicle it is entirely unnecessary to provide the ordinary manually operated clutch pedal for disengaging the clutch during unusual conditions of operation, or in the event it is for any reason undesirable to employ this mechanism.

Besides the embodiment disclosed herein, there are numerous modified and elemental forms and applications of the invention. The patentable limits are intended to be included within the scope of the appended claims.

What I claim as my invention is:

1. In a motor vehicle, the combination with the engine and a clutch having an actuating rock arm, of manually controlled power actuated means for operating said clutch comprising a casing rigidly mounted at the side of the engine crank case and including transversely extending cylinders and port connections therebetween, a piston in one of said cylinders, a rod directly connecting said piston with said clutch actuating rock arm, a rotary pilot valve and a surrounding sleeve valve in the other of said cylinders, a manually actuated means for rocking said pilot valve to various positions of adjustment, means enclosed within said casing connecting said sleeve valve with said piston and fluid pressure and exhaust connections to said valve cylinder.

2. In a motor vehicle, the combination with the engine and a clutch having an actuating rock arm, of manually controlled power actuated means for said clutch comprising a casing rigidly mounted on the side of the engine crank case and including cylinders having transverse axes and connecting ports therebetween, a piston in one of said cylinders, a rod directly connecting said piston with said clutch actuating rock arm, a rotary pilot valve and a surrounding sleeve valve located in the other of said cylinders, means enclosed within said casing comprising a rock arm on said sleeve valve and a rod connected to said piston engaging said rock arm for rotating said sleeve in proportion to the movement of said piston, a rock arm for actuating said pilot valve and a rod for actuating said latter rock arm extending through the toe board of the vehicle in a position for convenient pedal actuation.

3. In a motor vehicle, the combination with an engine provided with a crank case and oil pan, and a clutch having an actuating rock arm, of a manually controlled power actuating means for said clutch comprising a hollow bracket secured to the engine crank shaft and communicating with the oil pan, a casing mounted on said bracket having a valve cylinder therein with an exhaust passage communicating with the passage in said bracket and a second cylinder having its axis transverse to that of said valve cylinder and with a port connection to the latter, a piston in the last mentioned cylinder, a rod directly connecting said piston with said clutch operated rock arm, a rotary pilot valve and a surrounding valve sleeve located in said valve cylinder, a connection for supplying fluid under pressure to said valve cylinder, manually operable means for rotating said pilot valve to admit pressure fluid to said piston cylinder, and a connection between said piston and sleeve valve including a rod on the piston, a rock arm on the valve and a pivotal connection therebetween for the purpose described.

HORACE T. THOMAS.